US007164737B2

(12) United States Patent
Han

(10) Patent No.: US 7,164,737 B2
(45) Date of Patent: Jan. 16, 2007

(54) METHOD FOR ESTIMATING DOPPLER FREQUENCY

(75) Inventor: Kyoo-Jin Han, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 740 days.

(21) Appl. No.: 10/382,932

(22) Filed: Mar. 7, 2003

(65) Prior Publication Data

US 2004/0125873 A1 Jul. 1, 2004

(30) Foreign Application Priority Data

Dec. 20, 2002 (KR) ...................... 10-2002-0081721
Jan. 4, 2003 (KR) ...................... 10-2003-0000401

(51) Int. Cl.
*H04L 27/06* (2006.01)

(52) U.S. Cl. ........................ 375/344; 342/99; 342/106; 455/67.16

(58) Field of Classification Search ................ 375/344; 342/99, 100, 101, 104, 106, 114
See application file for complete search history.

(56) References Cited

U.S. PATENT DOCUMENTS 5,504,786 A * 4/1996 Gardner ...................... 375/347
6,614,860 B1 * 9/2003 Piirainen .................... 375/341
6,697,437 B1 * 2/2004 Arai et al. .................. 375/316

FOREIGN PATENT DOCUMENTS

JP 2002-261846 9/2002

* cited by examiner

*Primary Examiner*—Kevin Kim
(74) *Attorney, Agent, or Firm*—Fleshner & Kim LLP.

(57) ABSTRACT

Disclosed is a method for estimating a Doppler frequency with phase information, thereby estimating a maximum Doppler frequency. The method for estimating the Doppler frequency includes the steps of measuring phases of phase samples from a plurality of slots of a received signal, evaluating a phase difference of the measured phase, and estimating a maximum Doppler frequency according to a mean of at least one phase difference.

22 Claims, 4 Drawing Sheets

METHOD FOR ESTIMATING DOPPLER FREQUENCY

This application claims the benefit of the Korean Application No. P2002-81721 filed on Dec. 12, 2002, which is hereby incorporated by reference.

BACKGROUND OF THE INVENTION

1. Field of the Invention

The present invention relates to a mobile communication technology, and more particularly, to a method for estimating a Doppler frequency with phase information, thereby estimating a maximum Doppler frequency.

2. Discussion of the Related Art

According as frequency resource becomes important in mobile communication technology, adaptive receiver techniques have been paid much attention to an efficient usage of the frequency resource and a flexible resource management. There are a lot of factors to optimize a performance of the adaptive receiver. Above all, to estimate a maximum Doppler frequency is one of the most valuable factors. The maximum Doppler frequency has been estimated according to the variation of the measured pilot signal strength. However, the method for estimating a maximum Doppler frequency may have errors in case of that the adaptive receiver has a great Gaussian noise or a very high Doppler frequency.

In a communication system using a Phase Shift Keying (PSK) modulation of a non-coherent method, a maximum Doppler frequency is also estimated based on variations of the received signal strength. Particularly, in case of a communication system using Differential Phase Shift Keying (DPSK) modulation, because a pilot signal is not transmitted to a receiver, the receiver may estimate a maximum Doppler frequency using variations of another received signal such as traffic signal.

However, if the aforementioned method for estimating the maximum Doppler frequency with variations of a power for the received signal is applied to CDMA system using a rapid closed loop power control method, it has problems decreasing an accuracy in the estimating of a maximum Doppler frequency.

SUMMARY OF THE INVENTION

Accordingly, the present invention is directed to a method for estimating Doppler frequency that substantially obviates one or more problems due to limitations and disadvantages of the related art.

An object of the present invention is to provide to a method for estimating Doppler frequency for improving accuracy in the estimate of the maximum Doppler frequency with phase variations (phase differences) of received signals.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for estimating a Doppler frequency, comprises the steps of measuring phases of phase samples from a plurality of slots of a received signal, evaluating a phase difference of the measured phase, and estimating a Doppler frequency according to a mean of at least one phase difference.

In another aspect of the present invention, a method for estimating a Doppler frequency, comprises the steps of measuring phases of phase samples for successive slots of a demodulated pilot signal at each predetermined period $\tau$, evaluating a phase difference of the phases measured at the period $\tau$, evaluating a mean of an absolute phase difference, and estimating a maximum Doppler frequency with the mean of the absolute phase differences and the period $\tau$.

In still another aspect of the present invention, a method for estimating a Doppler frequency, comprises the steps of extracting phase samples for each of successive slots of a phase shift keying (PSK) demodulated signal, compensating the phases of a portion of the phase samples for each of the successive slots, evaluating a mean phase of the phase samples for each of the successive slots, evaluating respective differences of mean phases for every successive slots, evaluating a mean of absolute values of the differences, and estimating a maximum Doppler frequency with the mean of the absolute values and a period $\tau$ of extracting the phase samples.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Even though the present invention is illustrated with reference to the preferred embodiments, the present invention is not limited to the following preferred embodiments. That is, the present invention may include variations if they come within the scope of the main technology of the present invention.

In a method for estimating a maximum Doppler frequency according to a first preferred embodiment of the present invention, a phase difference of phases measured at each predetermined period $\tau$ is calculated, and a mean of phase differences calculated from the measured phases is calculated. And then, a maximum Doppler frequency is estimated from the calculated mean phase difference.

Especially, the present invention may be adapted to a communication system which does not transmit a pilot signal. That is, in a communication system transmitting a pilot signal, a maximum Doppler frequency is estimated based on phase variations in slots of the pilot signal. Meanwhile, a communication system, in which a pilot signal is not transmitted, uses phase differences in slots of a demodulated traffic signal to estimate the maximum Doppler frequency.

A method for estimating a maximum Doppler frequency according to a first preferred embodiment of the present invention includes following four steps.

1. Measure phases ( . . . , $\phi_{i-1}$, $\phi_i$, . . . ) of phase samples from a plurality of slots in a received signal at each predetermined period $\tau$. At this time, the received signal may be a pilot signal demodulated according to a coherent method, and a PSK demodulated signal (DPSK demodulated signal or BPSK demodulated signal) according to a non-coherent method.
2. Evaluate a phase difference $\phi_{i-1}-\phi_i$ between the phase samples measured for every at least two successive slots. And then, an absolute phase difference $|\phi_i-\phi_{i-1}|$ is evaluated.
3. Evaluate a mean Z of absolute phase differences as follows.

$$\hat{f}_D = \frac{Z}{\sqrt{2}\pi\tau}$$

4. Apply the mean Z of the absolute phase differences to the following equation $$Z = \frac{1}{N}\sum_{n=0}^{N}\left|\phi_n - \phi_{n-1}\right|$$

where $$\frac{1}{\sqrt{2}}$$

is a constant value used for estimating a maximum Doppler frequency in urban environments, and the constant value may vary based on a place of estimating a Doppler frequency. Therefore, the maximum Doppler frequency ($f_D$) is estimated.

Figure 1:
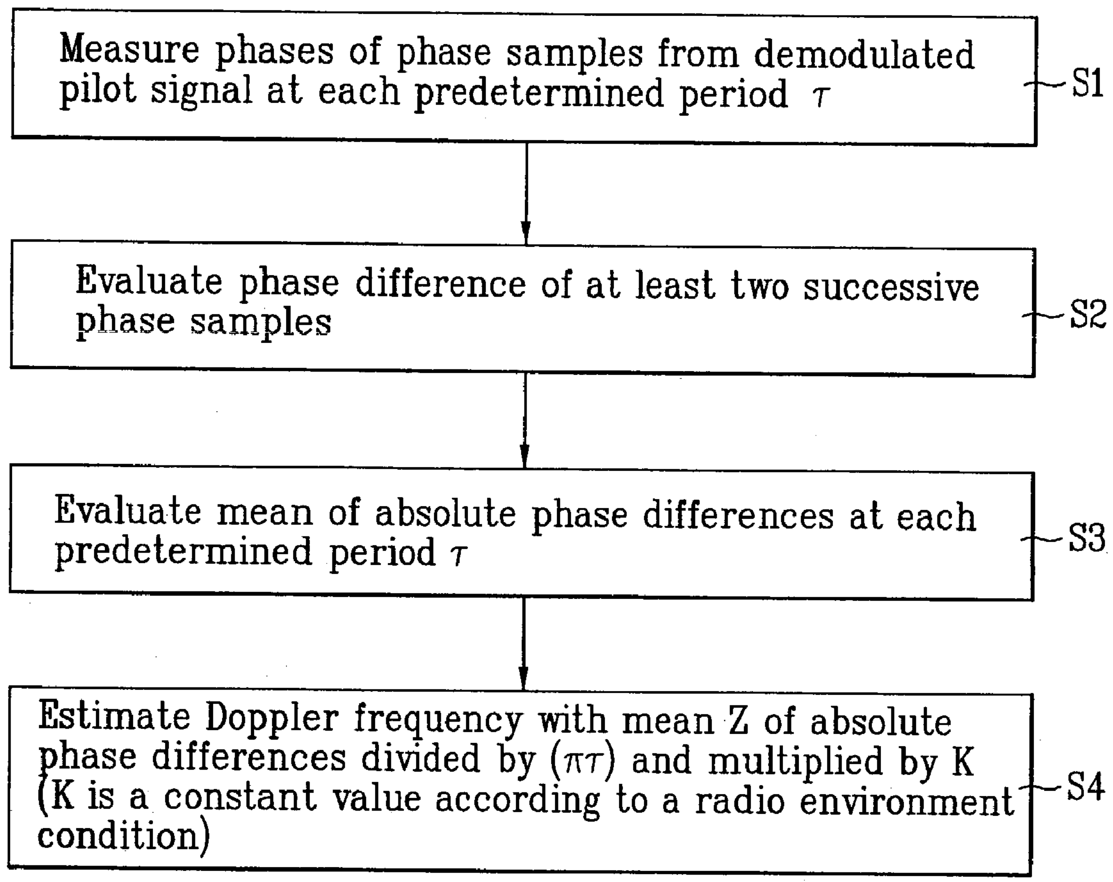
FIG. 1 is a diagram illustrating a method for estimating a maximum Doppler frequency according to the first preferred embodiment of the present invention.

FIG. 1 is a diagram illustrating a method for estimating a maximum Doppler frequency according to the first preferred embodiment of the present invention. That is, FIG. 1 illustrates the method for estimating the maximum Doppler frequency with a phase variation of a pilot signal.

Referring to FIG. 1, phases ( . . . , $\phi_{i-1}$, $\phi_i$, . . . ) of phase samples are measured from a demodulated pilot signal at each predetermined period $\tau$ (S1). Subsequently, a phase difference of the two successive phase samples is evaluated (S2). The phase difference ($\zeta_i$) of the at least two successive phase samples is expressed as following Equation 1.

$$\zeta_i=\phi_i-\phi_{i-1} \quad \text{[Equation 1]}$$

When $\zeta_i$ is a phase difference $\phi_2-\phi_1$ of the respective phases $\phi_2=\phi(t+\tau)$ and $\phi_1=(t)$, $\zeta$ satisfying $-\pi<\zeta<\pi$, the probability density function $P(\zeta)$ of $\zeta$ is expressed as following Equation 2. At this time, the following Equation 2 is an example of a probability density function of $\zeta$ in urban environments.

$$P(\zeta) = \frac{1-\lambda^2}{2\pi}\cdot\frac{\sqrt{1-\lambda^2\cos^2\zeta}+\lambda\cos\zeta\cos^{-1}(-\lambda\cos\zeta)}{(1-\lambda^2\cos^2\zeta)^{3/2}} \quad \text{[Equation 2]}$$

In the above Equation 2, $\lambda=J_0(2\pi f_{D\tau})$. At this time, $f_D$ is a maximum Doppler frequency.

Next, a mean of absolute phase differences evaluated at each predetermined period $\tau$ is evaluated (S3). Meanwhile, a mean $E(|\zeta|)$ of an absolute phase difference of $\zeta$ denoting a phase difference of the phase samples can be expressed as following Equation 3.

$$E(|\zeta|) == \int_0^{\pi}\left|\frac{\xi}{\pi}\right|P(\zeta)\,d\zeta = \int_0^{\pi}\frac{\zeta}{\pi}(1-\lambda^2)\cdot\frac{1-\lambda^2}{2\pi}\cdot\frac{\sqrt{1-\lambda^2\cos^2\zeta}+\lambda\cos\zeta\cos^{-1}(-\lambda\cos\zeta)}{(1-\lambda^2\cos^2\zeta)^{3/2}}\,d\zeta \quad \text{[Equation 3]}$$

In Equation 3, the mean $E(|\zeta|)$ of the absolute phase differences of $\zeta$ denoting the phase difference of the phase samples is directly related to a maximum Doppler frequency $f_D$.

A mean of absolute phase differences evaluated from 'N' phase samples is evaluated as following Equation 4.

$$Z = \frac{1}{N}\sum_{n=0}^{N}\left|\phi_n - \phi_{n-1}\right| \qquad E(|\zeta|) \approx Z_{N\to\infty} \quad \text{[Equation 4]}$$

In the above Equation 4, as 'N' is larger, 'Z' converges to $E(|\zeta|)$. That is, 'Z' is the approximation of $E(|\zeta|)$ evaluated at each predetermined period $\tau$.

According to Equation 3 and 4, a maximum Doppler frequency $f_D$ is related with a mean of an absolute phase difference 'Z' as shown Equation 5.

$$\hat{f}_D = K\frac{Z}{\pi\tau} \quad \text{[Equation 5]}$$

In Equation 5, the maximum Doppler frequency is estimated (S4). Also, a constant value K varies based on a radio environment condition. For example, K is $$\frac{1}{\sqrt{2}}$$

in the urban environments. At this time, a period $\tau$ satisfying $f_{D\tau}<0.4$ (where)

$$K = \frac{1}{\sqrt{2}}$$

may be marginally set to estimate a maximum Doppler frequency in a high Doppler frequency region. In this state, 'Z' obtains an accuracy of the approximation when satisfying $f_{D\tau}<0.4$.

The first preferred embodiment of the present invention using a phase difference of a demodulated pilot signal does not have any performance degradation in a communication system using the closed loop power control like CDMA system. Accordingly, if the first preferred embodiment of the present invention is applied to the CDMA system, an accuracy in estimating of a maximum Doppler frequency is improved.

However, in a communication system using a PSK modulation/demodulation of the non-coherent method, a pilot signal is not transmitted. A method for estimating a maximum Doppler frequency in the communication system that does not transmit the pilot signal will be described as follows.

Figure 2:
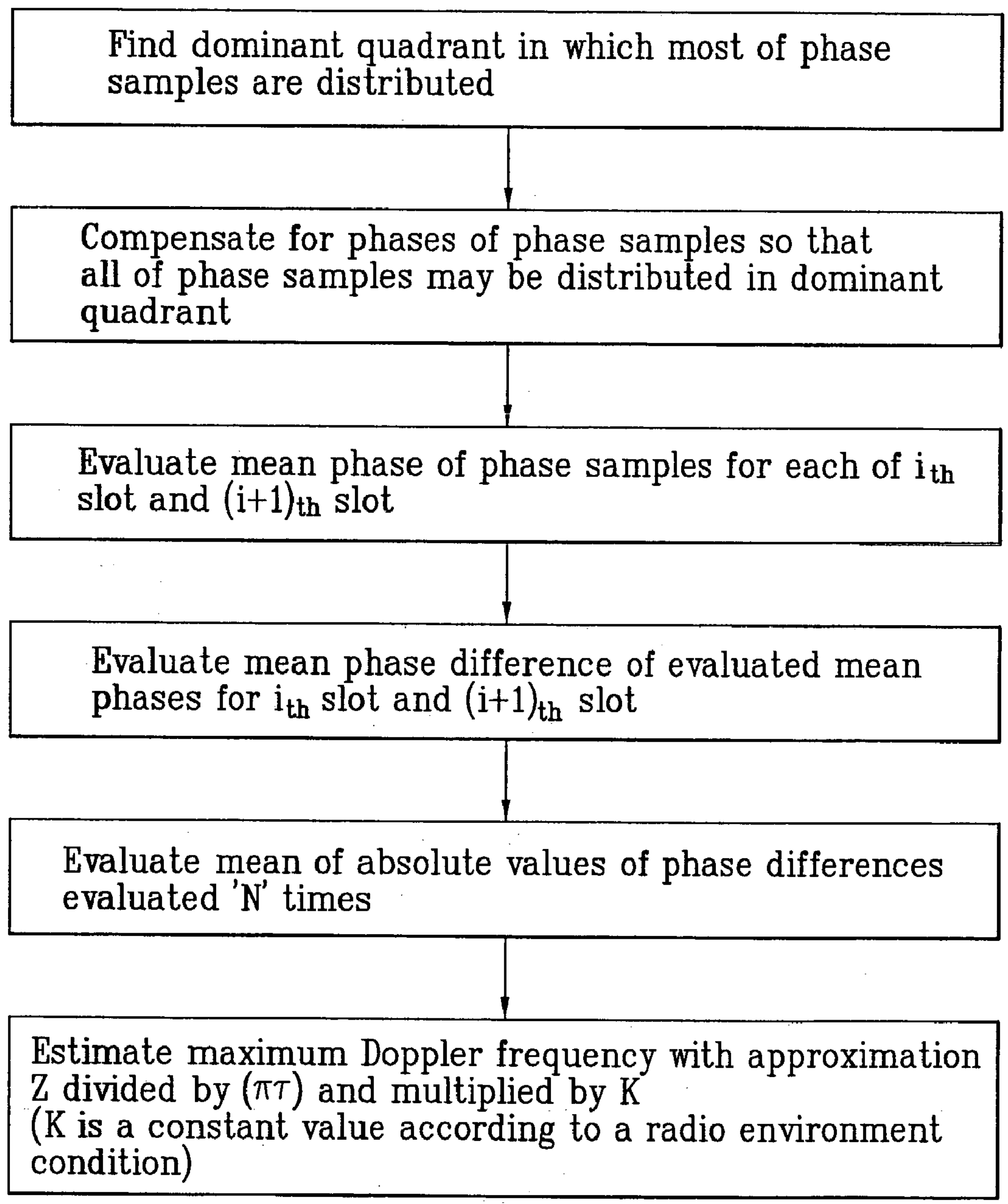
FIG. 2 is a diagram illustrating a method for estimating a maximum Doppler frequency according to the second preferred embodiment of the present invention.

FIG. 2 is a diagram illustrating a method for estimating a maximum Doppler frequency according to the second preferred embodiment of the present invention. FIG. 2 illustrates a case applied to a communication system using a PSK modulation/demodulation of the non-coherent method, especially in the communication system using a DPSK modulation/demodulation. Thus, a maximum Doppler frequency is estimated with a mean of phase differences of a PSK demodulated signal. Also, a method for estimating a maximum Doppler frequency according to the second preferred embodiment of the present invention may be applied to a communication system using a BPSK modulation/demodulation.

Figure 3:
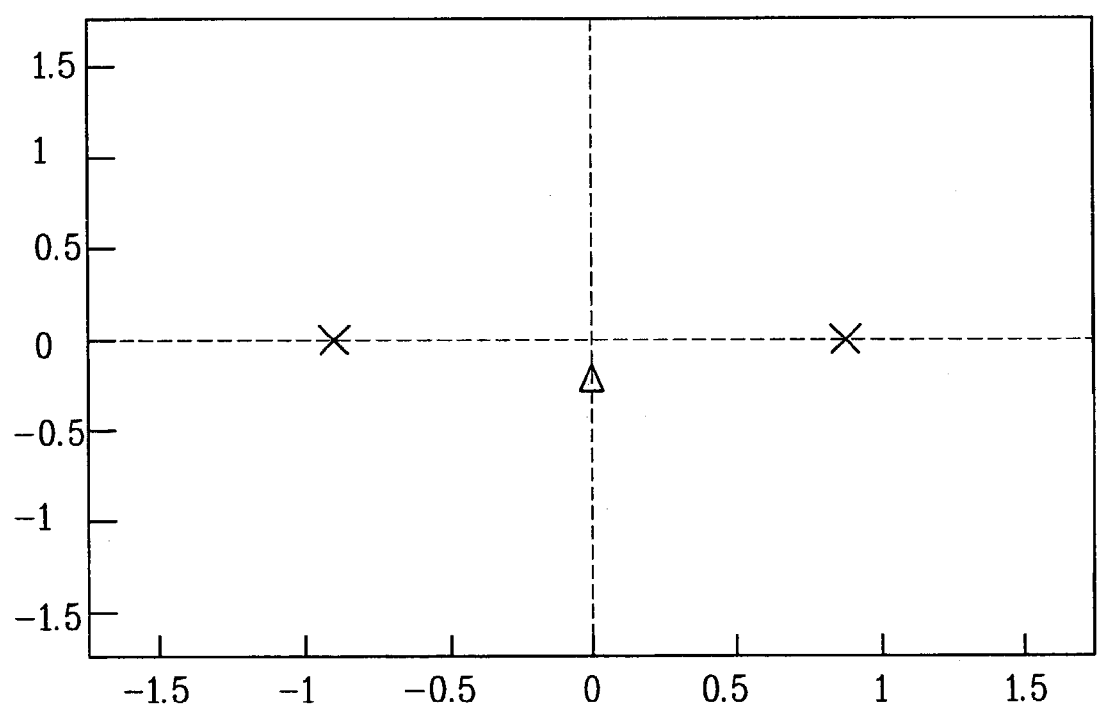
FIG. 3 illustrates standard constellation of a transmitted DPSK modulated signal.
Figure 4:
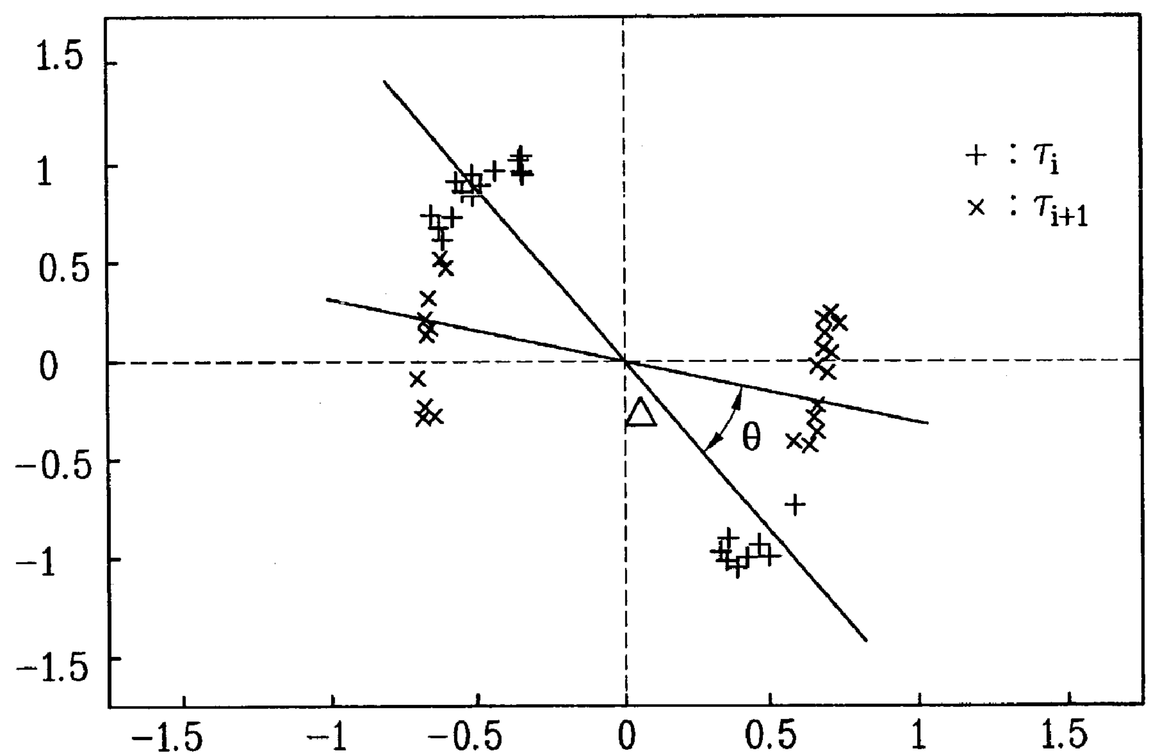
FIG. 4 illustrates standard constellations of a received DPSK demodulated signals for at least two successive slots.

An estimating procedure of FIG. 2 will be explained with reference to FIG. 3 and FIG. 4. FIG. 3 illustrates a standard constellation of a transmitted DPSK modulated signal, and FIG. 4 illustrates a standard constellation of a received DPSK demodulated signal for at least two successive slots.

First, a phase difference is evaluated for being applied to the aforementioned Equations 4 and 5. In fact, it is impossible to evaluate an absolute phase difference $|\phi_n-\phi_{n-1}|$ applied to Equation 4 in a communication system using a DPSK modulation/demodulation of the non-coherent method. Thus, the absolute phase difference $|\phi_n-\phi_{n-1}|$ applied to Equation 4 is evaluated through the following first to fifth steps, and a maximum Doppler frequency is estimated in the sixth step at the same way as the first embodiment of the present invention.

STEP 1: In FIG. 4 illustrating a constellation of the phase samples extracted for the 'i'th slot, most of the phase samples are distributed in two quadrants. That is, the phase samples distributed in one quadrant are transmitted without the phase shifting, and the phase samples distributed in the other quadrant are shifted at 180 degrees, and then transmitted. Thus, in a method for estimating a maximum Doppler frequency according to second preferred embodiment of the present invention, a dominant quadrant having many phase samples is firstly checked. At this time, the dominant quadrant may be a quadrant having the phase samples transmitted without the phase shifting, or not.

STEP 2: The phase samples are compensated for phases with a phase offset of 180 degrees so that all of phase samples may be located in the dominant quadrant of FIG. 4. Preferably, in the present invention, the phase samples transmitted from a transmitter without the phase shifting are distributed in the dominant quadrant, and the phase samples distributed in the other quadrant and transmitted from the transmitter with a phase shifting are compensated with a phase offset of 180 degrees (for compensating the phase of the DPSK modulated signal).

STEP 3: After compensating the phases samples with the phase offset of 180 degrees, a mean phase of the phase samples extracted for the 'i'th slot is evaluated. That is, a mean phase $\hat{\theta}_i$ of the phase samples for the 'i'th slot is evaluated.

STEP 4: For the next slot, (i+1)th slot, aforementioned first to third steps are performed to evaluate a mean phase $\hat{\theta}_{i+1}$ of phase samples extracted for the 'i+1'th slot.

STEP 5: A phase difference $\Delta\hat{\theta}_i$ is evaluated between the mean phase $\hat{\theta}_i$ for the 'i'th slot and the mean phase $\hat{\theta}_{i+1}$ for the 'i+1'th slot according to following Equations 6 and 7.

$$\Delta\hat{\theta}_i = \begin{bmatrix} k_i \cdot (\hat{\theta}_{i+1} - \hat{\theta}_i), \text{ for } || \hat{\theta}_{i+1} - \hat{\theta}_i | < | \hat{\theta}_{i+1} - (\hat{\theta}_i + \pi) \bmod (2\pi) || \\ k_i \cdot \hat{\theta}_{i+1} - (\hat{\theta}_i + \pi) \bmod (2\pi), \text{ for } || \hat{\theta}_{i+1} - \hat{\theta}_i | > | \hat{\theta}_{i+1} - (\hat{\theta}_i - \pi) \bmod (2\pi) || \end{bmatrix} \quad \text{[Equation 6]}$$

$$k_i = \begin{matrix} 1, \text{ if } \alpha_i > \alpha_{thresh} \\ 0, \text{ if } \alpha_i < \alpha_{thresh} \end{matrix} \quad \text{[Equation 7]}$$

When a DPSK modulated signal is "0", a binary signal value, the DPSK modulated signal is transmitted without a phase shifting. Meanwhile, when a DPSK modulated signal is "1", the DPSK modulated signal may have a phase shifting of 180 degrees, and then transmitted.

A constellation of a received DPSK demodulated signal is shown in FIG. 3, and a constellation of the received DPSK demodulated signal for at least two successive slots are shown in FIG. 4. In FIG. 4, the respective constellations means samples of a received signal.

A method for estimating a maximum Doppler frequency according to the second preferred embodiment of the present invention will be described with reference to FIG. 2.

In Equations 6 and 7, $K_i$ is a reliability factor, and $\alpha_i$ is a mean power the phase samples extracted for the 'i'th slot. In Equation 7, a received signal having a power more than a predetermined threshold value ($\alpha_{thresh}$) is used for estimating a maximum Doppler frequency.

In equation 6 of the present invention, a modular calculation is used with regard to selecting a dominant quadrant in which phase samples having shifted phases are distributed. That is, equation 6 takes into account of compensating for the phase samples with a phase offset of 180 degrees, wherein the phase samples are transmitted from a transmitter without a phase shifting.

In the second preferred embodiment of the present invention, the above first to fifth steps are repeated 'N' times at each predetermined period $\tau$.

STEP 6: The phase differences calculated 'N' times are applied to Equation 4 to evaluate a mean of absolute phase differences calculated 'N' times. Thus, the evaluated approximation Z is applied to Equation 5, whereby a maximum Doppler frequency is estimated.

In the second preferred embodiment, a phase difference $|\hat{\theta}_{i+1}-\hat{\theta}_i|$ of at least two successive slots is calculated from the respective mean phases $\hat{\theta}_i$ and $\hat{\theta}_{i+1}$ of the phase samples evaluated according to the third to fourth steps. Next, the phase difference is applied to Equation 4 to evaluate a mean of absolute phase differences, and the evaluated mean of the absolute phase differences is applied to Equation 5 to estimate a maximum Doppler frequency.

However, in the present invention, the calculated phase difference is decreased by the reliability factor $k_i$. This reason is that a phase difference evaluated from a received signal of a low power may generate errors in estimating a maximum Doppler frequency.

In the second preferred embodiment of the present invention, it is possible to extract phase information of a radio channel from a DPSK demodulated signal of the non-coherent method. Also, a maximum Doppler frequency is estimated by the extracted phase information.

As mentioned above, a method for estimating a maximum Doppler frequency according to preferred embodiments of the present invention has the following advantages.

In a communication system having a pilot signal, it is possible to improve accuracy in estimating a maximum Doppler frequency with phase variations for a plurality of slots of the pilot signal. In case of a communication system in which a pilot signal is not transmitted (especially, the system using a phase modulation/demodulation of the non-coherent method), a maximum Doppler frequency is estimated with a phase difference for at least two successive slots of a demodulated traffic signal with accuracy.

Especially, even if the method estimating a maximum Doppler frequency with the statistics of phase differences is applied to a CDMA system using a rapidly closed loop power control, accuracy is not impaired in estimating a maximum Doppler frequency because the phase information of the received signals is not influenced by the closed loop power control.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method for estimating a Doppler frequency, comprising:

(a) measuring phases of phase samples from a plurality of slots of a received signal, the phases measured for the slots at each of a plurality of predetermined periods;

(b) evaluating a phase difference of the measured phases in at least two slots for each of the periods, to derive a plurality of phase differences;

(c) computing a mean of the phase differences; and (d) estimating a Doppler frequency based on the mean computed in (c) and a value indicative of a radio environment condition.

2. The method of claim 1, wherein the received signal is a pilot signal in the (a) step, thereby measuring the phases of the phase samples for successive slots of the pilot signal at each predetermined period.

3. The method of claim 1, wherein the received signal is a phase shift keying (PSK) modulated signal according to a non-coherent method in the (a) step, thereby measuring the phases of the phase samples for successive slots of the PSK modulated signal at each predetermined period.

4. The method of claim 1, wherein (b) includes:

evaluating an absolute phase difference of the measured phases in the at least two slots for each of the periods.

5. The method of claim 1, wherein (c) includes computing a mean of absolute values of the phase differences calculated at each of the predetermined periods; and wherein (d) includes estimating a maximum Doppler frequency based on the evaluated mean of the absolute phase differences, and the period ($\tau$), and said value indicative of a radio environment condition.

6. A method for estimating a Doppler frequency, comprising:

(a) measuring phases of phase samples for successive slots of a demodulated pilot signal at each of a plurality of predetermined periods $\tau$;

(b) evaluating a phase difference of the phases measured at each of the periods $\tau$, to derive a plurality of phase differences;

(c) evaluating a mean of absolute values of the phase differences; and (d) estimating a maximum Doppler frequency based on the mean of the absolute values of the phase differences, the period $\tau$, and a value indicative of a radio environment condition.

7. The method of claim 6, wherein a mean of absolute phase differences for 'N' phase samples is evaluated in an approximation as follows in the (c) step:

$$Z = \frac{1}{N}\sum_{n=0}^{N} |\phi_n - \phi_{n-1}|.$$

8. A method for estimating a Doppler frequency, comprising:

(a) measuring phases of phase samples for successive slots of a demodulated pilot signal at each of a plurality of predetermined periods $\tau$;

(b) evaluating a phase difference of the phases measured at each of the periods $\tau$, to derive a plurality of phase differences;

(c) evaluating a mean of absolute values of the phase differences; and (d) estimating a maximum Doppler frequency based on the mean of the absolute values of the phase differences, and the period $\tau$ wherein, in (d), the mean Z of the absolute values of the phase differences for 'N' phase samples is evaluated according to following equation, $$Z = \frac{1}{N}\sum_{n=0}^{N} |\phi_n - \phi_{n-1}|.$$

and wherein the maximum Doppler frequency ($f_D$) is estimated by $$\hat{f}_D = K\frac{Z}{\pi\tau}$$

where K is a constant value according to a radio environment condition.

9. A method for estimating a Doppler frequency, comprising:

(a) extracting phase samples for each of successive slots of a phase shift keying (PSK) demodulated signal;

(b) compensating the phases of a portion of the phase samples for each of the successive slots;

(c) evaluating a mean phase of the phase samples for each of the successive slots;

(d) evaluating respective differences of mean phases for every successive slots;

(e) evaluating a mean of absolute values of the differences; and (f) estimating a maximum Doppler frequency with the mean of the absolute values and a period $\tau$ of extracting the phase samples.

10. The method of claim 9, wherein the PSK demodulated signal is modulated by one of DPSK and BPSK modulation methods.

11. The method of claim 9, wherein the (b) step comprising:

(g) defining one quadrant as a dominant quadrant, the dominant quadrant in which lots of phase samples are distributed; and (h) compensating phases of phase samples which are not distributed in the main quadrant so that all of phase samples may be distributed in the main quadrant.

12. The method of claim 11, wherein, if the PSK demodulated signal is a DPSK demodulated signal in the step (h), phases of the phase samples which are not distributed in the main quadrant are compensated at 180 degrees.

13. The method of claim 9, wherein a difference of the mean phases is evaluated for every successive slots of the PSK demodulated signal having a power more than a predetermined threshold value ($\alpha_{thresh}$) in the (d) step.

14. The method of claim 9, wherein, in the (f) step, a mean of the absolute phase differences for 'N' phase samples is evaluated according to following equation, $$Z = \frac{1}{N}\sum_{n=0}^{N} |\phi_n - \phi_{n-1}|.$$

whereby the maximum Doppler frequency ($\hat{f}_D$) is estimated by $$\hat{f}_D = K\frac{Z}{\pi\tau}$$

where K is a constant value varying according to a radio environment condition.

15. The method of claim 1, wherein said value is a constant value indicative of the radio environment condition.

16. The method of claim 1, wherein said value is a value indicative of the radio environment condition at a predetermined location.

17. The method of claim 1, wherein the Doppler frequency is further estimated based on a probability density function corresponding to a radio environment condition, wherein the radio environment condition of the probability density function matches the radio environment condition of said value.

18. The method of claim 1, wherein the Doppler frequency is a maximum Doppler frequency.

19. The method of claim 1, wherein the Doppler frequency is measured for the received signal in a communications receiver operating based on a closed loop power control method.

20. The method of claim 1, wherein the received signal is a pilot signal.

21. The method of claim 1, wherein the received signal is a traffic signal.

22. The method of claim 1, wherein the received signal is a PSK signal.

* * * * *